United States Patent
Kilbourne et al.

[15] 3,643,310
[45] Feb. 22, 1972

[54] MILLING WHEEL STRUCTURE

[72] Inventors: Ralph Werner Kilbourne, Glenn Mills; Frank L. Di Ferdinando, West Chester, both of Pa.

[73] Assignee: Westinghouse Electric Corporation, Pittsburgh, Pa.

[22] Filed: Dec. 8, 1969

[21] Appl. No.: 883,015

[52] U.S. Cl. ................................................29/105, 29/97
[51] Int. Cl. ...........................................B26d 1/00, B26d 1/12
[58] Field of Search ....................29/103, 105, 103 A, 105 A, 29/97

[56] References Cited

UNITED STATES PATENTS

| | | | |
|---|---|---|---|
| 2,761,196 | 9/1956 | Graves et al. | 29/105 A |
| 3,203,072 | 8/1965 | Careje | 29/105 A |
| 1,460,030 | 6/1923 | Mattson | 29/105 A |
| 2,645,003 | 7/1953 | Thompson et al. | 29/105 |
| 3,200,474 | 8/1965 | Kvalowetz | 29/105 |
| 3,175,276 | 3/1965 | Weber et al. | 29/105 |

Primary Examiner—Harrison L. Hinson
Attorney—A. T. Stratton, F. P. Lyle and F. Cristiano, Jr.

[57] ABSTRACT

A milling wheel structure for a milling machine comprising a circumferential row of interchangeable cartridges which are nonsymmetrically spaced on the periphery of the wheel. The cartridges receive disposable multiedge cutters, which are rotatable to bring other edges into cutting relation. The cutters are of the finishing or semifinishing type, both of which may be used simultaneously or individually.

6 Claims, 9 Drawing Figures

WITNESSES
Alfred G. Colaizzi
Bruce L. Samlan

INVENTORS
Kilbourne Ralph Werner
Frank L. DiFerdinando
BY

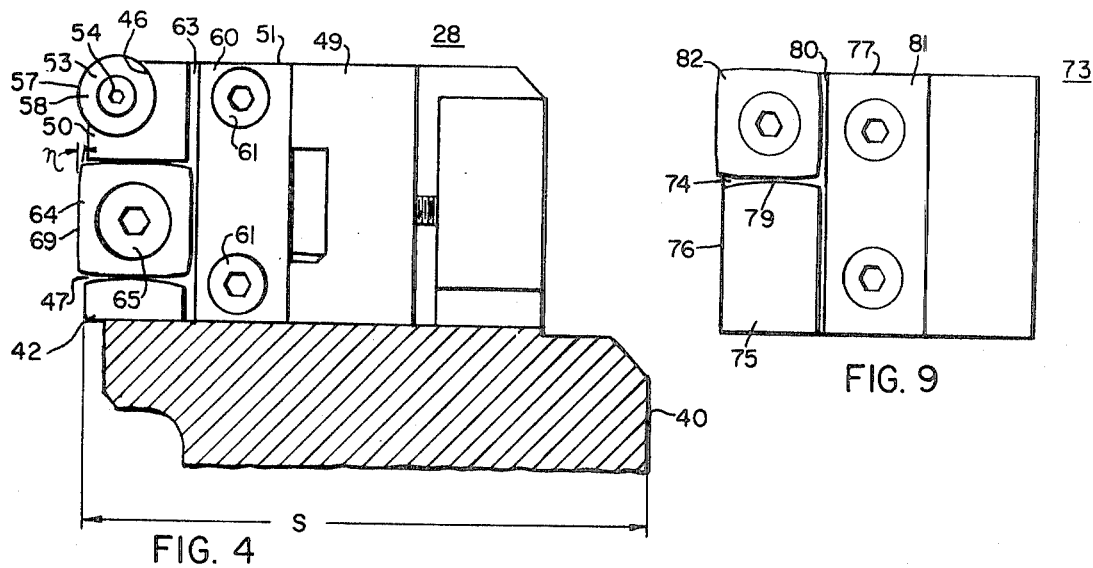
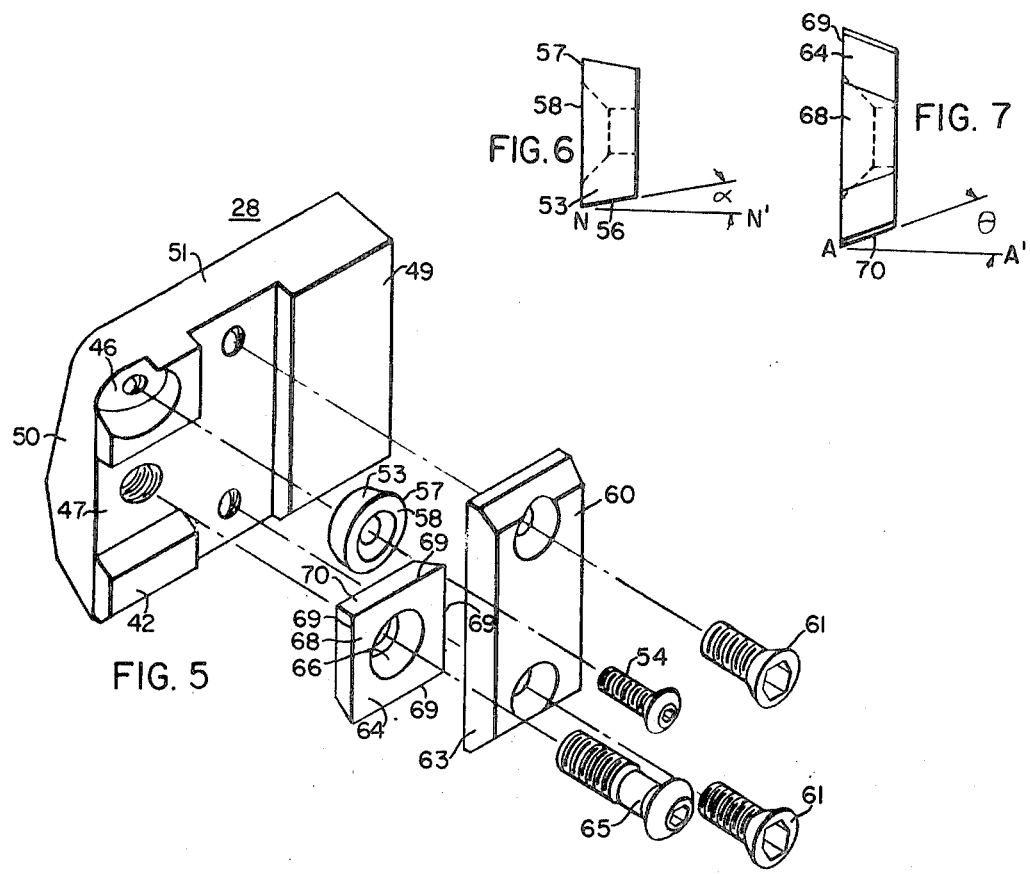

MILLING WHEEL STRUCTURE

BACKGROUND OF THE INVENTION

The following disclosure relates to milling machines and more particularly to a rotatable milling wheel structure.

One of the major problems in milling, where large workpieces such as turbine casings are to be milled is that severe vibrations occur on the workpieces as the cutters on the rotating wheel come in contact with the workpieces. These vibrations limit the rate of feed of the workpieces or the speed at which the wheel traverse the workpieces. Furthermore, the vibrations and the kind of metal to be milled limit the types and grades of material used as milling cutters.

Large turbine casings are now very large and will be even larger in the future. For example, turbine casing halves made of low carbon steels weigh approximately 52 tons and require extensive, time consuming finishing machining operations. Furthermore, the finishing of the turbine casings requires extremely close machining tolerances. As harder and more brittle cutter material is used for finer finishes and closer tolerances, there is a corresponding increase in cutter failures. On the other hand, as the cutter materials become less hard, there is a corresponding increase in wearing and chipping of the cutters. This results in more rapid cutter replacement, the limiting of obtainable tolerances, and the restricting of the quality of finishes available. Previously, the hardest commercially usable material in milling cutters for large fabrications of low carbon steels was tungsten carbide. Titanium carbide cutters, for example, proved too brittle.

Another problem common to the conventional milling process is that the worn milling cutters are often reground and used again. The grinding process is time consuming and expensive. Furthermore, it is necessary to determine the amount the cutter was reduced so that the cutter can be replaced in the wheel at a constant preset cutting distance. This is necessary to maintain a precision, numerically controlled milling process.

A still further problem is that large fabrications are first "rough machined," "semifinished" in a second operation and are finally "finish machined" in a third operation. This results in considerable time and expense to perform three operations individually and to convert and reconvert from one operation to another.

It would be desirable then, to design a milling cutter that would minimize the vibrations of the workpiece, thereby increasing the rate of feed and enable the use of a harder material for the cutters. It would further be desirable to use a multisided, disposable cutter that could be easily and economically replaced. Furthermore, it would be desirable to perform the semi-finishing and the finishing operations simultaneously. When it is necessary to perform these operations individually, it would be desirable to be able to readily convert from one operation to another.

SUMMARY OF THE INVENTION

The invention comprises a cylindrical wheel structure for a milling machine. The wheel has radially extending fingers, integral therewith, defining slots nonsymmetrically spaced circumferentially on its peripherally. Firmly secured in the slots is a corresponding number of interchangeable cartridges extending axially. Disposable cutters are fastened to the cartridges. The cutters project axially beyond a face of the wheel to some predetermined degree.

In the preferred embodiment each cartridge has two preset, pre-shaped, side-by-side openings which accept two corresponding preshaped cutters; the radially outward cutter on the cartridge is of the semifinishing type and the radially inward cutter is of the finishing type.

The second embodiment is similar to the preferred except that each cartridge has only one cutter of the finishing type on the radially outward portion of the cutter.

The cutters have multiple edges so that, upon wearing, the cutters are rotatable to bring outer edges into cutting relation. After all edges are worn, the old cutters are removed and replaced with new cutters.

The cartridges and cutters are nonsymmetrically spaced peripherally so as to minimize vibrations and to enable the use of harder steel cutters. This has the advantages of permitting an increased rate of feed of the workpiece without damage to the cutters or workpiece, prolonging the life of the cutters, obtaining closer tolerances, and providing finer finishes. Since the cutters are rotatable, have multiple edges, and are disposable, these features provide cutters that can be easily and economically replaced while eliminating the need for grinding the cutters. The cartridges may be capable of holding two different types of cutters and can perform both the semifinishing and finishing operations simultaneously. Finally, since the cartridges are interchangeable, the time for converting from one operation to another is minimized.

BRIEF DESCRIPTION OF THE DRAWINGS

FIG. 4 is a fragmentary view partially in section and partially in elevation taken approximately along line V—V in FIG. 8 and showing a view of a cutter cartridge;

FIG. 5 is an exploded view of one of the cutter cartridges;

FIG. 6 and 7 are side elevational views of the cutters employed in the cartridges;

FIG. 9 is an elevational view on the same scale as FIG. 4 of another cutter cartridge.

DESCRIPTION OF THE PREFERRED EMBODIMENT

Figure 1:
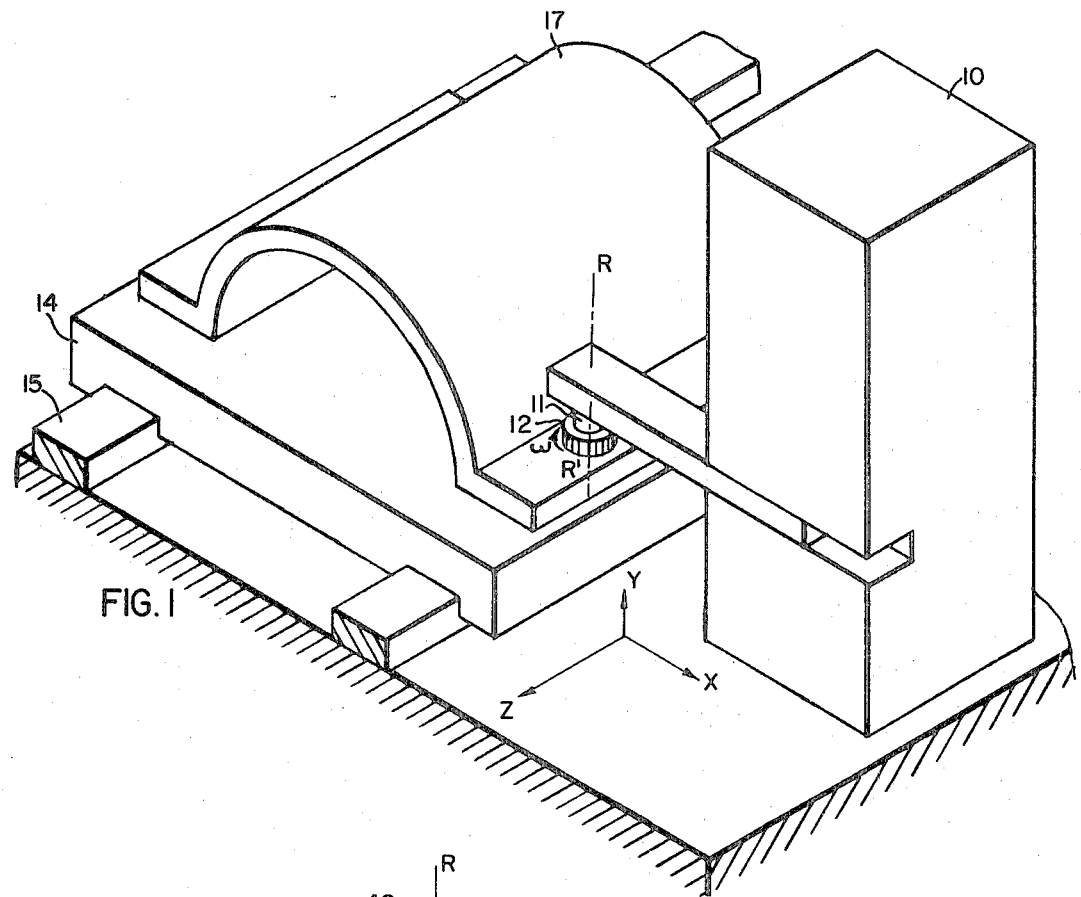
FIG. 1 is a perspective view of a workpiece being milled by a machine having a milling wheel structure formed in accordance with the present invention.

Referring to FIG. 1, there is shown a representative milling machine 10 having a vertically extending shaft 11 rotatable in the direction indicated by arrow ω (although the shaft could also be extended horizontally). A circular milling wheel structure 12 embodying the invention is secured to the shaft 11. The wheel structure 12 and the shaft 11 have been greatly enlarged for clarity because of their small sizes relative to the size of the milling machine 10. The milling wheel structure 12 comprises a wheel 12a having a central bore 13 (FIG. 2) mounted concentrically on the shaft 11. On a machine bed 14 which may have ways 15 for guiding movement in a direction indicated by the arrow Z is a workpiece 17 which as shown is one-half of an outer turbine casing. The milling machine 10 may move in any of three directions as indicated by arrows X, Y and Z. The workpiece 17 is shown being fed into the milling wheel structure 12, it being understood that the milling machine 10, the bed 14, the shaft 11, and the workpiece 17 comprise no part of the invention.

Figure 2:
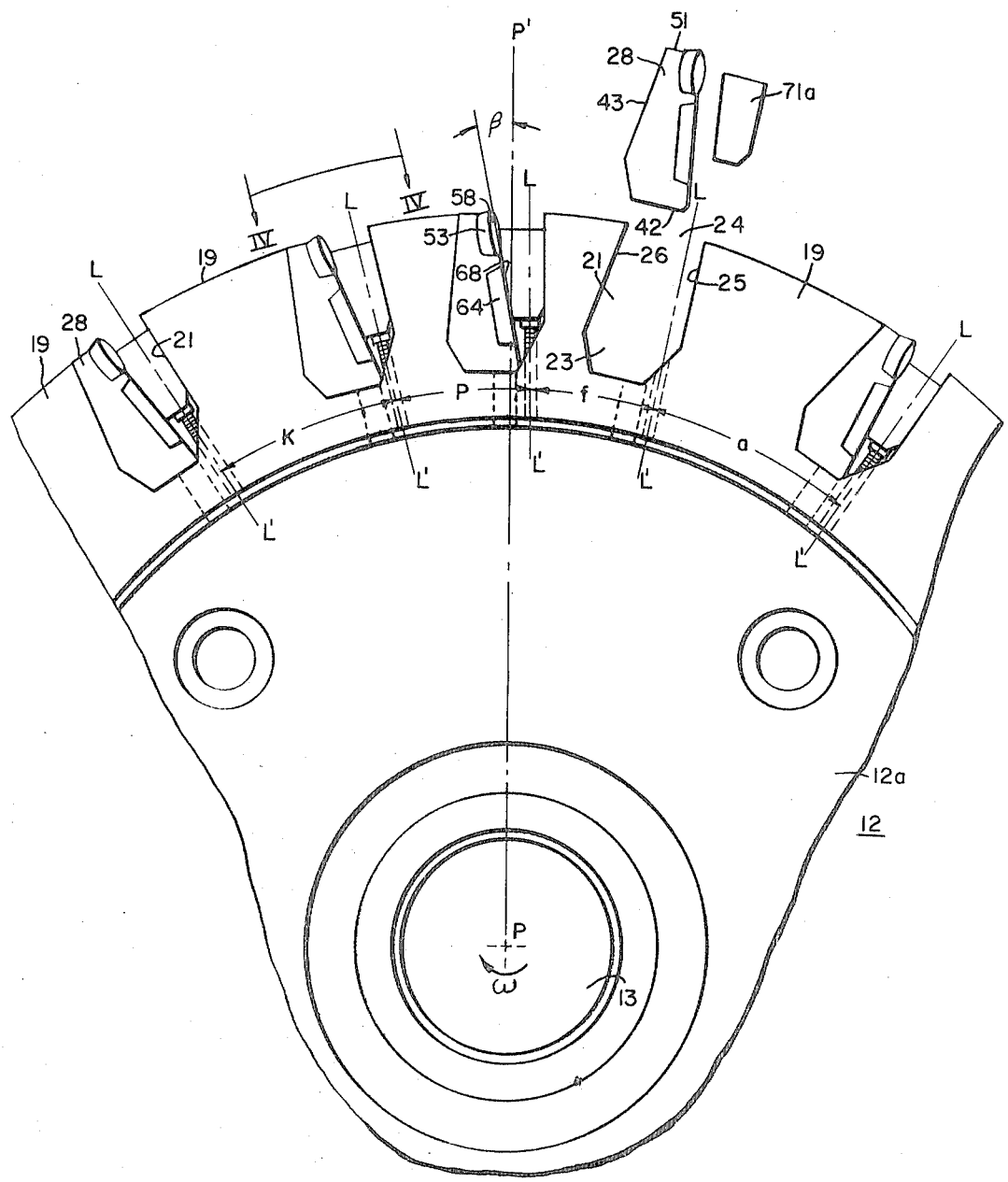
FIG. 2 is an enlarged plan view of a portion of the milling wheel structure shown in FIG. 1.

An enlarged plan view of the milling wheel structure 12 is shown in FIG. 2, with one portion exploded for clarity. Extending radially outward from the axis of rotation of the wheel R-R' is a series of fingers 19 which are integral with the wheel 12a. The fingers 19 define an annular row of radially extending slots 21. The radially inward portions 23 of the slots 21 and the radially outward portions 24 are at equal radial distances from the axis of rotation R-R'. The radially outward portions 24 extend through the periphery of the wheel 12a. The slots 21 are partially defined by leading wall portions 25 and trailing wall portion 26. In a peripheral direction, the fingers 19 and slots 21 are nonsymmetrically spaced so that no two fingers or slots are diametrically opposite to each other. The slots 21 are approximately equal in size and similar in shape and the fingers 19 are similar in shape but circumferentially unequal in width.

Figure 3:
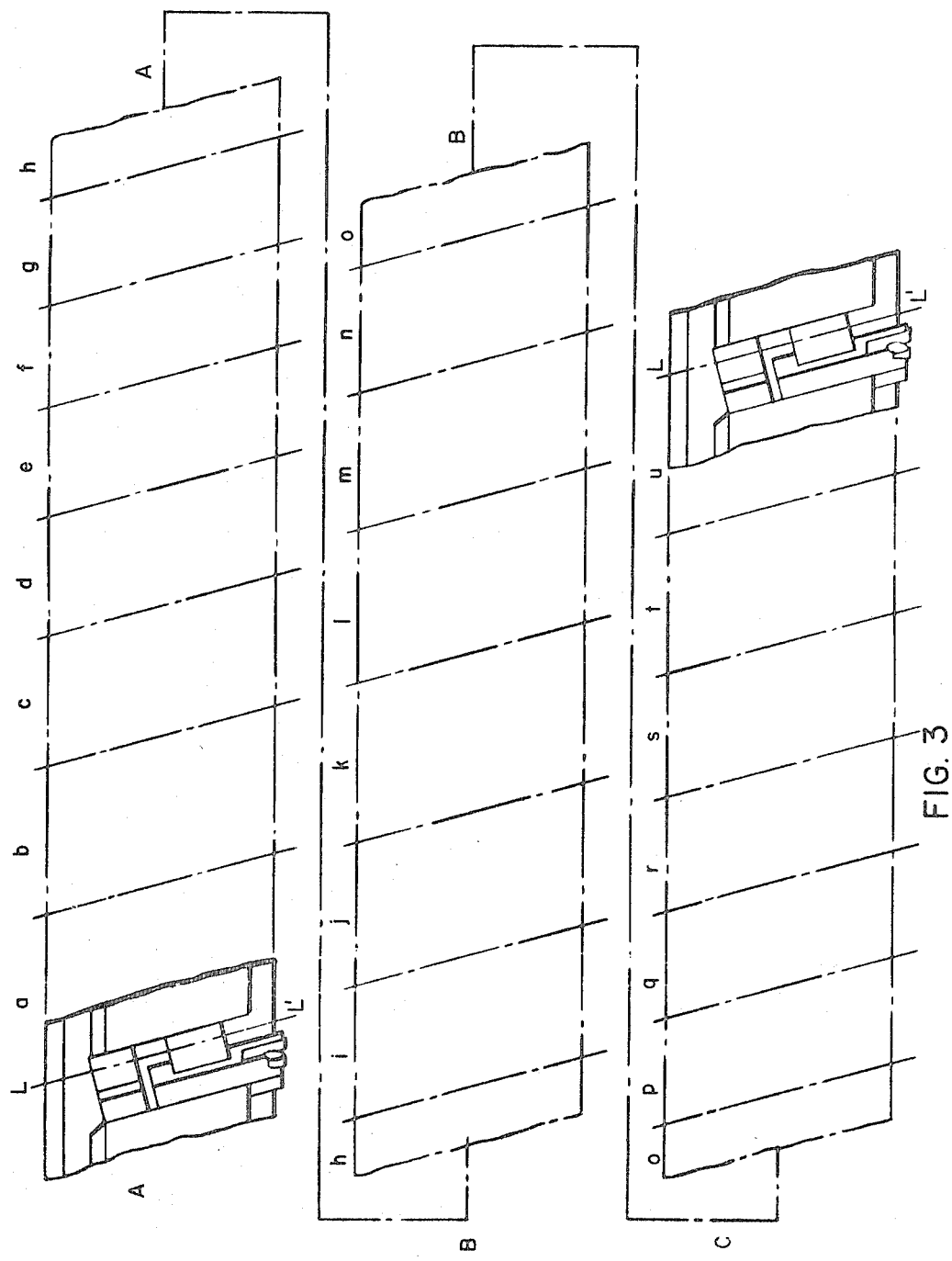
FIG. 3 is a developed schematic view on a smaller scale than FIG. 2 showing a peripheral view of the milling wheel structure.

On a 16-inch diameter wheel, fingers 19 and 21 have been employed to show in FIG. 2, four representative angular spacings $k$, $p$, $f$, and $a$, to indicate the nonsymmetrical spacing arrangement. FIG. 3 shows a developed plan view of this milling wheel where the plan is divided into three sections, A, B, and C, disposed in parallel relation one below the other and connected by dot-dash lines A-B and B-C indicating one continuous piece. The angular spacing arrangement is given in the table below in radians and degrees where the alphabetical suffixes represent the angular spacing from reference lines L-L' between the slots 21.

| Spacing | Radians | Degrees |
| --- | --- | --- |
| a | 0.3863 | 22° 8' 00'' |
| b | 0.3427 | 19° 38' 7'' |
| c | 0.3078 | 17° 38' 8'' |
| d | 0.2792 | 15° 59' 49'' |
| e | 0.2554 | 14° 38' 00'' |
| f | 0.2353 | 13° 28' 54'' |
| g | 0.2500 | 14° 19' 26'' |
| h | 0.2728 | 15° 37' 50'' |
| i | 0.3000 | 17° 11' 19'' |
| j | 0.3332 | 19° 5' 27'' |
| k | 0.3733 | 21° 23' 19'' |
| l | 0.3527 | 20° 12' 29'' |
| m | 0.3158 | 18° 5' 38'' |
| n | 0.2859 | 16° 22' 51'' |
| o | 0.2609 | 14° 56' 55'' |
| p | 0.2399 | 13° 44' 47'' |
| q | 0.2449 | 14° 1' 55'' |
| r | 0.2668 | 15° 17' 12'' |
| s | 0.2928 | 16° 46' 35'' |
| t | 0.3243 | 18° 48' 1'' |
| u | 0.3632 | 20° 48' 35'' |

As indicated in FIG. 2, four representative spacings have been shown. For example, referring to the above table, angular spacing $k$ corresponds to 0.3733 radians or 21° 23'19''$p$ corresponds to 0.2399 radians or 13° 44' 47'', $f$ corresponds to 0.2353 radians or 13° 28' 54'' and $a$ corresponds to 0.3862 radians or 22° 8' 00''.

A plurality of cartridges 28 corresponding in number, size and shape to the series of slots 21 are positioned to the slots. Fastening means are used to secure the cartridges 28 in the slots 21 and to allow for the minute adjustments necessary for precision milling.

As best seen in FIG. 2, the cartridges 28 are inserted in the slots 21, so the radially inward edges 42 of the cartridges 28 are in abutment with the wheel 12a at the radially inward portions 23 of the slots 21. The trailing faces 43 of the cartridges 28 fit into corresponding and contoured surfaces in the trailing portions 26 of the fingers 19. As best seen in FIG. 4 and FIG. 5, two preformed and preshaped side-by-side openings 46 and 47 are on the leading face 49 near the top portion 50 of each cartridge 28. The opening near the radially outward edge 51 is approximately circular in section to accommodate a rotatable, disposable cutter 53 frustoconically shaped.

As shown in FIG. 6, the frustoconical cutter 53 has a sloped wall 56 and a base 58 the wall and the base defining the edge 57 which is the cutting edge. Since the edge 57 is circularly continuous, only a portion of the edge is operative at any setting. Hence the cutter 53 may be deemed to be multisided. As shown in FIG. 6, the wall 56 of the cutter 53 is sloped at an angle $\alpha$ which is 10° relative to a plane N-N' normal to the base 58 of the cutter.

Figure 8:
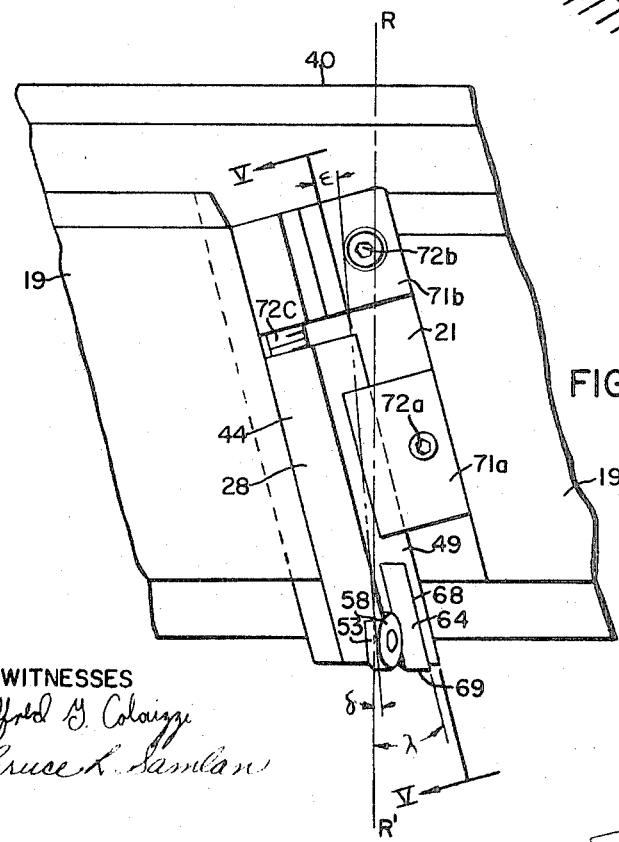
FIG. 8 is an enlarged fragmentary view taken along line IV—IV in FIG. 2 showing one of the cutter cartridges.

Fastening means such as a screw 54 is placed through a hole in the center of each cutter 53 securing the cutter to the cartridge 28. The cutter 53 projects slightly beyond the top portion 50 of the cartridge 28 in an axial direction and slightly beyond the radially outward edge 51. The base 58 makes an angle $\beta$ of 10° with a radial plane P-P', best seen in FIG. 2, which is a negative rake angle relative to the rotational direction $\omega$ of the wheel 12a. In the axial direction, the cutting base 58 makes an angle $\delta$ of 5° with a plane going through the rotational axis R-R', as shown in FIG. 8, which is a positive rake angle relative to the rotation $\omega$ of the wheel 12a. The cutting base 58 of the cutter 53 is inclined at an angle $\epsilon$ of 10° with the leading face 49 of the cartridge 28 (FIG. 8).

The second preshaped opening 47 is located towards the radially inward edge 42 of the cartridge 28 as shown in FIGS. 4 and 5. A plate 60 is secured to the leading face 49 of the cartridge 28 by fastening means 61. The surface 63 of the plate 60 is accurately machined and provides a wall for the opening 47. The opening 47 is approximately rectangular in section, with the top side removed and receives a rotatable disposable cutter 64 which is approximately frustopyramidically shaped.

As shown in FIG. 5, the frustopyramidically shaped cutter 64 has a square base 68 having four sides 69 and a sloped wall 70. The four sides 69 of the base 68 of the cutter 64 form four cutting edges. The two opposite ends of each edge 69 are slightly tapered at an angle $\eta$ which is a 3° lead angle (FIG. 4) to minimize chatter and help prevent chipping of the edges. Referring to FIG. 7 it can be seen that the wall 70 of the frustopyramidical cutter 64 is inclined at an angle $\theta$ of 20° with a plane A-A' normal to the base 68 of the cutter 64. The base 68 of the cutter 64 makes an angle $\beta$ which is a 10° negative rake angle with a radial plane P-P' relative to the rotational direction $\omega$ of the wheel 12a as shown in FIG. 2. The base 68 of the cutter 64 is inclined at an angle $\lambda$ which is a 15° positive axial rake angle with a plane going through the axis of rotation R-R' (FIG. 8). The base 68 of the cutter 64 is flush with the leading face 49 of the cartridge 28. The cutter 64 is positioned so that cutting edge 69 extends axially beyond the top portion 50 of the cartridge 28 best shown in FIG. 4. Fastening means such as a screw 65 is inserted through a hole 66 in the center of each cutter 64 into the cartridge 28 to secure the cutter to the cartridge.

As shown in FIG. 8, the fastening means comprise locking wedges 71a and 71b, lift wedges 71c, and differential screws 72a, 72b, and 72c.

The lock wedges 71b and the lift wedges 71c are inserted into the slots 21 at a known distance from the bottom side 40 of the wheel 12a. Differential screws 72b are inserted radially inward through the lock wedges 71b, extending into the wheel 12a and locking the lift wedges 71c between the fingers 19 and the lock wedges 71b. Differential screws 72c are inserted axially through the lift wedges 71c into the bottom portions 44 of the cartridges 28 to adjust the axial extension of the cartridges as best seen in FIG. 8.

Lock wedges 71a are then inserted between the fingers 19 and the cartridges 28. Differential screws 72a extend radically inward through the wedges 71a into the wheel 12a locking the cartridges 28 to the wheel and preventing radial and axial movement. This type of wedge arrangement provides each removal and installation of the cartridges 28 while allowing for fine adjustments.

Because of the nonsymmetrical spacing of the cartridges in a peripheral direction, the vibrational waves caused by the cutters hitting the metal at nonuniform time intervals cause damping and prevent resonance from occurring. This damping enables the use of harder cutters. For example, the cutters 53 which do the semifinishing operation can be made of tungsten carbide. The finishing cutters 64 can be made of titanium carbide. Since these cartridges 28 and cutters 58 and 64 perform both semifinishing and finishing operations, these are called combination cutter cartridges.

The effects of reduced vibrations and harder cutters are the prolonging of the lives of the cutters, the increasing of the rate of feed of the workpiece, and the obtaining of closer tolerances, resulting in finer finishes. For example, tests using the new combination cutter cartridges on low carbon steel fabrications have been conducted and the results have shown that at a linear feed rate of between 35 to 70 inches per minute, tolerances of 15-25 micro inches were obtainable 80 percent of the time. Under similar testing conditions in conventional milling processes, the maximum range of feed rate without damage to the cutters or workpiece was 12 to 20 inches per minute with tolerances of 80 to 125 micro inches which were only dependable 60 percent of the time.

From the above, it can be seen that the maximum workable feed rate increased from 20 inches per minute to 70 inches per minute or a 250 percent increase; the tolerances were reduced on the low range from 80 micro inches to 15 micro inches or a 81 percent decrease; and the dependability was increased from 60 percent to 80 percent or a 33 percent increase.

The semifinishing cutters 53 being the radially outermost of the two cutters, first come in contact with the workpiece 11 (FIG. 1). On the initial passes, the semifinishing cutters 53 rough the workpiece and prepare it for the finishing cutters 64. On successive passes, the feed is increased and while the semifinishing cutters 53 are roughing a new portion of the workpiece, the finishing cutters 64 are working on the portions just semifinished. Both operations are then effectively performed simultaneously, and approximately one-half the time of performing both operations individually is saved.

Additionally, the cutters 53 and 64 are multisided and rotatable about their centers. Therefore, once preset distances for positioning the cutters 53 and 64 are determined, any new edges 57 and 69 of the cutters after rotation are at a known distance with no adjustments needed. With this type of arrangement, the cartridges 28 and cutters 53 and 64 can be set very accurately with a minimum of effort. The radial distance of the cartridges 28 is set by insertion of the cartridges into the formed slots 21. The axial distance S (FIG. 4) is set by measuring from the bottom side of the wheel 12 to the cutter edges 57 and 69 and can be set within 50 millionths of an inch by methods well known in the art because of the wedge arrangement previously discussed.

The semifinishing cutters 53 and the finishing cutters 64 are rotated at the same time, but because the semifinishing cutters are rounded and have more cutting edges, about one-half of the cutters 53 are used per four sides of the finishing cutters 64.

After all edges 57 and 69 wear, the cutters 53 and 64 are removed from the cartridges 28. Previously, cutters were ground requiring a precision process in which it was necessary to determine how much of the edges were removed from the cutting edge so the cutters could be properly reset. Now the cutters 53 and 64 are disposed of and replaced. No grinding is required.

DESCRIPTION OF THE SECOND EMBODIMENT

Referring to FIG. 9, a cartridge 73 is shown which is employed in the same manner as cartridge 28 mounted in a wheel already described. This cartridge 73 is similar to cartridge 28 but differs in the following. The cartridge 73 has a preformed and preshaped opening 74 located on the leading face 75, toward the top portion 76, and, near the radially outward edge 77 of the cartridge 73. This cartridge 73 is called the finishing cartridge.

The openings 74 have two defining edges, one edge 79 being on the cartridge and the second edge 80 being precision ground on plate 81 which is similar to plate 60 in the preferred embodiment. Finishing cutters 82 are secured to the cartridges 73, the cutters being similar to and interchangeable with the frustopyramidically shaped finishing cutters 64 in the preferred embodiment. The combination of the cartridge 73 and the cutter 82 is called the finishing cutter cartridge.

The finishing cartridges 73 are dimensionally approximately equal to and interchangeable with the combination cartridges 28 described in the primary embodiment so that they can easily and economically replace the combination cartridges 28 when switching from one operation to another. Additionally, in numerically controlled machines the interchangeability of the cartridges 28 and 73 gives the added flexibility necessary for minor adjustments.

The finishing cartridges 73 are used when it is necessary to mill a restricted area such as a corner or ledge of a workpiece 17 (FIG. 1) to which the finishing cutters 64 on the combination cartridges 28 cannot get.

Although more than one embodiment has been shown, it is intended that all the matter contained in the foregoing description or shown in the accompanying drawings shall be interpreted as illustrative and not in a limiting sense. For example, the finishing cutters 64 of the combination cutter cartridges can be removed to form semifinishing cutter cartridges which may be used when a semifinishing operation is only required.

What is claimed is:
1. In a rotatable milling wheel,
said wheel having radially extending fingers,
said fingers defining radially extending slots,
said fingers and slots being nonsymmetrically spaced in a peripheral direction,
a series of interchangeable cartridges received in said slots,
said cartridges having leading faces and trailing faces,
each leading face having a pair of side-by-side, preset, preshaped openings,
half of said openings being on said leading face near the radially outer edge and top portion of each cartridge,
the other half of said openings being on said leading face near the radially inward edge and near the top portion on each cartridge,
a plurality of preshaped semifinishing cutters,
said semifinishing cutters being frustoconically shaped and having multiple edges,
a plurality of preshaped finishing cutters,
said finishing cutters being frustopyramidically shaped and having multiple edges,
said semifinishing cutters being secured to the corresponding preshaped radially outer openings,
said finishing cutters being secured to the radially inner openings, and
fastening means to secure said cartridges to said wheel.
2. In a rotatable milling wheel,
said wheel having radially fingers integral therewith,
said fingers defining radially extending slots,
said fingers and slots being nonsymmetrically spaced in a peripheral direction,
a series of cartridges received in said slots,
each cartridge having at least one preset and preshaped opening,
a plurality of cutters,
said cutters having multiple cutting edges,
fastening means securing said cutters in said openings to said cartridges,
fastening means to secure said cartridges to said wheel,
said cartridges being interchangeable with each other,
said cartridges having leading and trailing faces,
said leading faces having pairs of side-by-side, preset and preshaped openings,
half of said openings being on said leading faces near the radially outer edges and the top portions of said cartridges,
the other half of said openings being on said leading faces near the radially inward edges of said cartridges,
corresponding preshaped semifinishing cutters secured to said radially outer openings,
and corresponding preshaped finishing cutters secured to said radially inner openings.
3. The structure defined in claim 2 wherein the semifinishing cutters are frustoconically shaped,
and the finishing cutters are frustopyramidically shaped.
4. In a rotatable milling wheel,
said wheel having radially extending fingers integral therewith,
said fingers defining radially extending slots,
said fingers and slots being nonsymmetrically spaced in a peripheral direction,
a series of cartridges received in said slots,
each cartridge having at least one preset and preshaped opening, a plurality of cutters,
said cutters having multiple cutting edges,
fastening means securing said cutters in said openings to said cartridges,
fastening means to secure said cartridges to said wheel,
said cartridges being interchangeable with each other,
said cartridges having leading and trailing faces,
preset and preshaped openings on the leading faces near the radially outer edges and the top portions of said finishing cartridges,
a plurality of preshaped finishing cutters corresponding in shape to said openings,
said cutters being disposed in said openings, and
fastening means to secure said cutters to said cartridges.

5. The structure defined in claim 4 wherein the cartridges extend outwardly in an axial direction.

6. The structure defined in claim 4 wherein the finishing cutters are frustopyrammidically shaped.

* * * * *